Aug. 19, 1958     G. S. SANGDAHL, JR     2,847,756
CLADDING ASSEMBLY WITH INTERNAL COVER PLATE
Filed April 19, 1955
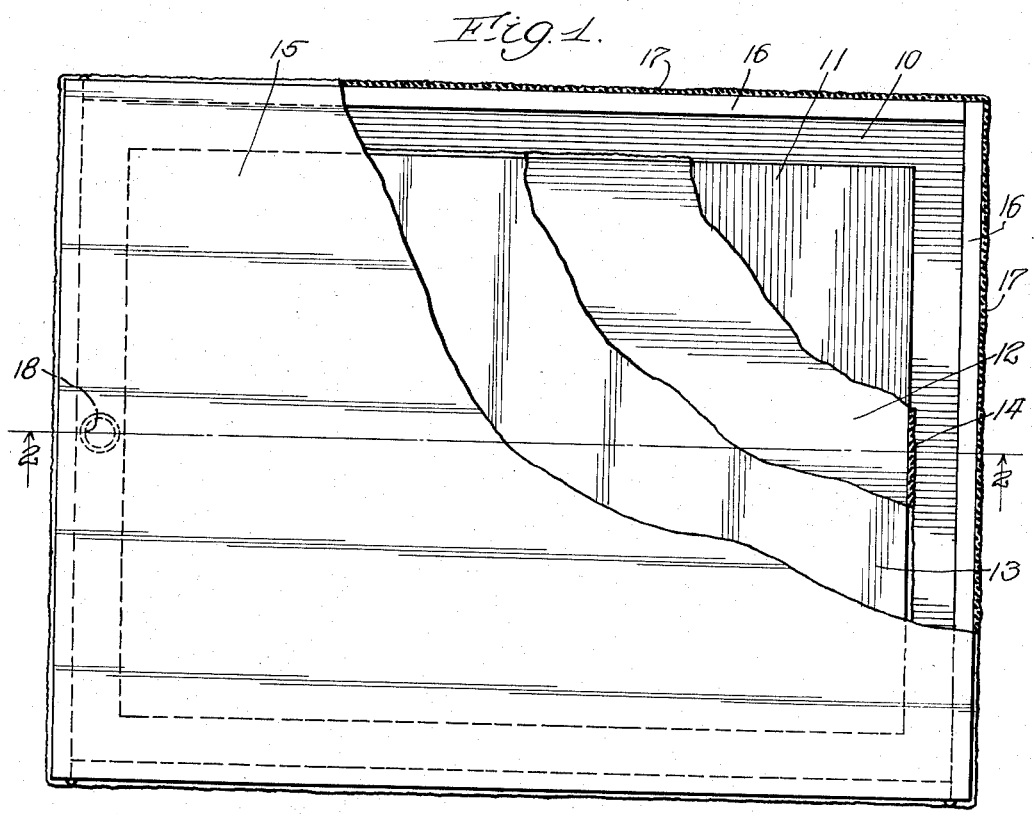
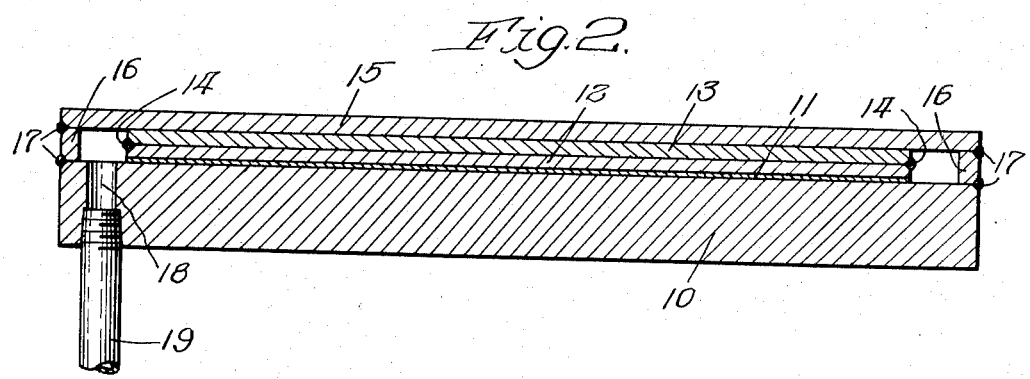
Inventor:
George Stanley Sangdahl, Jr.
By Merriam & Lorch
Attys.

United States Patent Office 2,847,756
Patented Aug. 19, 1958

2,847,756
CLADDING ASSEMBLY WITH INTERNAL COVER PLATE

George Stanley Sangdahl, Jr., Birmingham, Ala., assignor to Chicago Bridge & Iron Company, a corporation of Illinois Application April 19, 1955, Serial No. 502,398

2 Claims. (Cl. 29—470.9)

This invention relates to vacuum cladding and assemblies used in this process. More particularly, this invention is concerned with a novel cladding sandwich for use in such process.

According to the Robert L. Brown process of vacuum cladding as disclosed in Serial No. 487,676, now Patent 2,713,196, base metals are clad by placing a sheet of cladding metal and a sheet of metal to be clad in substantially face-to-face arrangement with a thin layer of brazing metal between them, applying a vacuum of at least 18 inches of mercury gauge, and preferably a substantially complete vacuum such as above 28–29 inches, in the area to be clad, sealing the area to be clad from the atmosphere, heating the assembled sandwich to a brazing temperature sufficient to melt the brazing material and have it wet the mating surfaces, and cooling the sandwich below the melting range of the brazing material to complete the cladding process. The vacuum is maintained at least until the brazing material melts and preferably until the clad product has been cooled to room temperature.

One of the most useful assemblies or cladding sandwiches for vacuum cladding comprises a base plate, brazing material, cladding plate and a cover plate in face-to-face arrangement in that order, the cover plate being sealed around its periphery to the base plate and the cladding plate being somewhat smaller so that it is enveloped by the cover plate and the base plate. A corridor is thereby created around the cladding plate and between the base plate and cover plate. By running an outlet from this corridor to a vacuum pump the area to be clad is readily evacuated prior to heating.

A single cladding sandwich of this type, while of great use, however occasionally lets molten brazing material penetrate between the bottom of the cover plate and the top of the cladding plate, impairing the surface of the clad and sometimes binding the cover plate to the cladding plate. The brazing material is believed to penetrate this area through the action of capillary forces.

I have now discovered that the surface of the cladding plate may be protected from erosion by, and alloying with, the molten brazing material by placing an inner cover plate over the upper face of the cladding plate and welding the two plates together at their edges. This assembly is then placed in face-to-face contact with a base plate with brazing material between the base plate and lower surface of the cladding plate. A second and upper cover plate is placed over the composite assembly and sealed to the base plate. The sandwich may then be evacuated and cladding achieved as previously described.

The invention will now be described in conjunction with the attached drawings in which:

Fig. 1 is a plan view of a cladding sandwich having the inner cover plate; and

Fig. 2 is a section at 2—2 of Fig. 1.

According to one embodiment of my invention I take a base plate 10 as in Figs. 1 and 2 and then place cladding plate 12 in face-to-face arrangement with the base plate with brazing material 11 between the base plate and cladding plate. I then place an inner cover plate 13 over the cladding plate and of about the same size as the cladding plate, seal the inner cover plate to the cladding plate at the edges thereof as by weld 14 and place an outer cover plate 15 over the inner cover plate. The outer cover plate is usually larger than the inner cover plate and of about the size and external dimensions (not thickness) of the base plate. Shims 16 are provided to bridge the space between the outer cover plate and the base plate when the space cannot be spanned by a weld alone. Welds 17 may be used to hermetically seal the outer cover plate to the base plate when shims are used. An opening 18 is provided in the base plate leading to the corridors; this opening may extend out of the cover plate 15 if desired. Line 19 leads to a vacuum pump for evacuation of the area to be clad. An opening (not shown) is provided in weld 14 permitting gases released between the cladding plate and inner cover plate to exit and be removed by the vacuum pump.

The inner cover plate, as well as the outer cover plate may be of any suitable metal. Preferably, however, low cost steel sheet is used since it is rendered essentially unusable for anything else after the heating operation is completed.

The usual base plate metals are ordinary steels and the usual cladding metals are what may be defined as special alloys, this term including materials which have unusual properties of corrosion resistance, high or low temperature resistance or other like properties. Within this term are included nickel bearing steels, stainless steels, Monel metal, nickel, copper, silver, gold and the like. A brazing material is used which wets and bonds the clad to the base metal. It is evident that the brazing material must have a lower melting point than any of the other sheets or plates comprising the sandwich.

The sandwich assembly of this invention is particularly useful in the cladding of comparatively thick, such as 2" or greater, base plates although it is also suitable for use with thinner plates being clad in single cladding sandwiches.

The word "plates" as used herein is not intended to be restricted to the engineering definition for plates but is also intended to include sheets.

The following example is included to illustrate a specific embodiment of the invention.

EXAMPLE

A round cladding sandwich was prepared having a section as in Fig. 2 of a 2' 7" dia. x 5½" steel base plate, enough 0.01" thick copper brazing foil, a 2' 3½" dia. x ½" stainless steel cladding plate, a 2' 3" dia. x 20 ga. stainless steel inner cover plate, an outer cover plate 2' 6" dia. x ⅛" low carbon steel and 5/16" x ½" steel shims. The vacuum line was 1¼" dia. extra heavy seamless steel pipe. The top surface of the clad sheet and the bottom of the inner cover were painted with aluminum oxide and welded together with 3/32" stainless steel electrodes; a ¼" vent was left to allow hot gases to escape during bonding.

The sandwich was bonded for 15 minutes at 2050° F. according to the schedule in Table I following.

Table 1

| Time, min. | Plate Temp., °F. In Plate[1] | Plate Temp., °F. On Plate | Furnace Temp., °F. Location #1 | Furnace Temp., °F. Location #2 | Vacuum, microns |
|---|---|---|---|---|---|
| 0 | | | 1,800 | 1,800 | 13 |
| 2 | | | 1,560 | 1,610 | |
| 4 | | | | | 150 |
| 5½ | | | | | |
| 7 | | | 1,740 | 1,810 | |
| 8 | 280 | | | | |
| 12 | 440 | | 1,800 | 1,880 | 100 |
| 22 | 680 | | 1,880 | 1,960 | 85 |
| 32 | 900 | 1,920 | 1,950 | 2,030 | 32 |
| 42 | 1,085 | 1,950 | 2,000 | 2,060 | 32 |
| 52 | 1,245 | 2,040 | 2,040 | 2,065 | 34 |
| 72 | 1,450 | 2,030 | 2,050 | 2,060 | 35 |
| 92 | 1,650 | 2,030 | 2,050 | 2,060 | 36 |
| 112 | 1,850 | 2,030 | 2,050 | 2,050 | 28 |
| 132 | 1,935 | 2,040 | 2,050 | 2,050 | 23 |
| 152 | 1,990 | 2,080 | 2,050 | 2,100 | 21 |
| 172 | 2,025 | 2,090 | 2,090 | 2,110 | 19 |
| 192 | 2,048 | 2,090 | 2,090 | 2,110 | 17 |
| 207 | Removed from furnace and air cooled | | | | |

[1] Temperature in the plate was measured with an imbedded thermocouple.

The clad was checked for continuity by ultrasonic inspection and shear and bend tests were made. The bond was found to be excellent with no run in of brazing material on the surface of the clad.

Various changes and modifications of the invention can be made and, to the extent that such variations incorporate the spirit of this invention, they are intended to be included within the scope of the appended claims.

What is claimed is:
1. A cladding sandwich assembly comprising a base plate and a cladding plate in face-to-face arrangement with brazing material between said plates, an inner cover plate sealed to the cladding plate about the edges thereof to prevent run-in of brazing material on the upper surface of the cladding plate during heating, an outer cover plate in face-to-face arrangement with the inner cover plate, said outer cover plate being hermetically sealed to the base plate, and an outlet by which a vacuum can be created in the area to be clad.

2. The method of vacuum cladding to prevent run-in of brazing material on the surface of the cladding metal which comprises placing a cladding plate in face-to-face arrangement with a base plate and brazing material between said plates, welding an inner cover plate to about the edges of the cladding plate, placing an outer cover plate in face-to-face arrangement with the inner cover plate, welding the outer cover plate to the base plate, providing an opening to the area between the outer cover plate and the base plate, evacuating the area to be clad through such opening until a vacuum of at least 18 inches of mercury gauge is produced, heating the assembly to a brazing temperature, cooling the assembly and removing the cover plates.

References Cited in the file of this patent
UNITED STATES PATENTS

| | | |
|---|---|---|
| 1,931,311 | Young | Oct. 17, 1933 |
| 2,147,407 | Huston et al. | Feb. 14, 1939 |
| 2,713,196 | Brown | July 19, 1955 |